(12) United States Patent
Theodosakis et al.

(10) Patent No.: US 12,420,665 B2
(45) Date of Patent: Sep. 23, 2025

(54) SELECTIVE EARLY CHARGE TERMINATION

(71) Applicant: Textron Innovations Inc., Providence, RI (US)

(72) Inventors: Gregory August Theodosakis, Martinez, GA (US); Russell William King, Evans, GA (US); Jonathan Daniel Bowen, North Augusta, SC (US)

(73) Assignee: Textron Innovations Inc., Providence, RI (US)

( * ) Notice: Subject to any disclaimer, the term of this patent is extended or adjusted under 35 U.S.C. 154(b) by 174 days.

(21) Appl. No.: 18/494,084

(22) Filed: Oct. 25, 2023

(65) Prior Publication Data
US 2025/0135948 A1    May 1, 2025

(51) Int. Cl.
*B60L 58/15*    (2019.01)

(52) U.S. Cl.
CPC ........... *B60L 58/15* (2019.02); *B60L 2240/54* (2013.01); *B60L 2240/622* (2013.01)

(58) Field of Classification Search
CPC ................. B60L 58/15; B60L 2240/54; B60L 2240/622; B60L 2200/22; Y02T 10/70; Y02T 10/7072
See application file for complete search history.

(56) References Cited

U.S. PATENT DOCUMENTS

| | | | |
|---|---|---|---|
| 7,698,078 B2 | 4/2010 | Kelty et al. | |
| 8,232,763 B1 | 7/2012 | Boot | |
| 8,371,405 B2 | 2/2013 | Ortmann et al. | |
| 8,615,355 B2 | 12/2013 | Inbarajan et al. | |
| 9,007,020 B2 | 4/2015 | Prosser et al. | |
| 9,274,540 B2 | 3/2016 | Anglin et al. | |
| 9,333,872 B2 | 5/2016 | Maya et al. | |
| 9,592,742 B1 | 3/2017 | Sosinov et al. | |
| 9,637,019 B2 | 5/2017 | Bassham et al. | |
| 9,658,076 B2 | 5/2017 | Aich et al. | |
| 9,674,771 B2 | 6/2017 | Bridges et al. | |
| 9,830,753 B2 | 11/2017 | Luke et al. | |
| 9,969,288 B2 | 5/2018 | Ikeda et al. | |
| 10,065,517 B1 | 9/2018 | Konrardy et al. | |
| 10,086,714 B2 | 10/2018 | Penilla et al. | |
| 10,160,340 B2 | 12/2018 | Lindemann et al. | |
| 10,442,300 B2 | 10/2019 | Huston et al. | |

(Continued)

*Primary Examiner* — Michael C Zarroli
(74) *Attorney, Agent, or Firm* — BainwoodHuang (57) ABSTRACT

Techniques are directed to charging a battery of a utility vehicle. Such techniques involve receiving a geolocation signal which identifies a current location of the utility vehicle. Such techniques further involve generating a geolocation assessment result indicating whether the utility vehicle is currently within an early charge termination geographic area based on the geolocation signal. Such techniques further involve charging the battery in accordance with the geolocation assessment result, the battery being charged to a first charge threshold when the geolocation assessment result indicates that the utility vehicle is currently not within the early charge termination geographic area, and the battery being charged to a second charge threshold when the geolocation assessment result indicates that the utility vehicle is currently within the early charge termination geographic area. The second charge threshold is different from the first charge threshold.

18 Claims, 6 Drawing Sheets

(56) References Cited

U.S. PATENT DOCUMENTS

| | | | |
|---|---|---|---|
| 10,543,753 B2 | 1/2020 | Wechsler et al. | |
| 10,556,513 B2 | 2/2020 | Kamen et al. | |
| 10,611,247 B1 | 4/2020 | Breen | |
| 10,647,218 B1 | 5/2020 | Huang et al. | |
| 10,737,577 B2 | 8/2020 | Kapadia et al. | |
| 10,850,630 B2 | 12/2020 | Korenaga et al. | |
| 10,857,902 B2 | 12/2020 | Goei et al. | |
| 10,861,066 B2 | 12/2020 | Khoo et al. | |
| 10,882,411 B2 | 1/2021 | Yang et al. | |
| 11,027,624 B2 | 6/2021 | Grace et al. | |
| 1,099,569 A1 | 8/2021 | Clark | |
| 11,124,080 B2 | 9/2021 | Donnelly et al. | |
| 11,133,688 B2 | 9/2021 | Schaffer et al. | |
| 11,192,463 B2 | 12/2021 | Corey | |
| 11,205,239 B2 | 12/2021 | Luke et al. | |
| 11,214,161 B2 | 1/2022 | Miller et al. | |
| 11,225,167 B2 | 1/2022 | Irwin | |
| 11,338,693 B2 | 5/2022 | Bachmann et al. | |
| 11,413,982 B2 | 8/2022 | Goei | |
| 11,538,097 B2 | 12/2022 | Luke et al. | |
| 11,563,331 B2 | 1/2023 | O'Hara et al. | |
| 11,571,974 B2 | 2/2023 | Gaither et al. | |
| 11,836,131 B1 * | 12/2023 | Gronowski | G01C 21/3841 |
| 2012/0005031 A1 | 1/2012 | Jammer | |
| 2015/0266391 A1 | 9/2015 | Hoystyn et al. | |
| 2019/0184836 A1 * | 6/2019 | Smith | B60L 53/14 |
| 2021/0048302 A1 | 2/2021 | Maeda et al. | |
| 2022/0146582 A1 | 5/2022 | Salcone et al. | |
| 2022/0250486 A1 | 8/2022 | Mccalmont | |
| 2022/0297550 A1 | 9/2022 | Joao | |
| 2022/0299337 A1 | 9/2022 | Joao | |
| 2022/0337076 A1 * | 10/2022 | Bower | B60L 58/40 |
| 2022/0371470 A1 | 11/2022 | Naito et al. | |
| 2022/0379743 A1 | 12/2022 | Salter et al. | |
| 2022/0379767 A1 | 12/2022 | Salter et al. | |
| 2024/0010081 A1 * | 1/2024 | Williams | B60L 53/665 |

* cited by examiner

SELECTIVE EARLY CHARGE TERMINATION

BACKGROUND

An electric golf cart includes a rechargeable battery and an electric motor connected to the golf cart's drive wheels through the drivetrain. During operation, the rechargeable battery electrically powers the electric motor to provide electric golf cart propulsion. To slow and/or stop the electric golf cart, the electric motor performs regenerative braking which provides electric charge back to the rechargeable battery for future use.

A conventional approach to recharging the electric golf cart from a main power feed (e.g., a wall outlet or charging portal that connects to street power) involves supplying electric charge to the rechargeable battery through a power converter until the amount of charge stored within the rechargeable battery reaches a full target threshold (i.e., a full state of charge). Once the power converter charges the rechargeable battery to the full target threshold, circuitry within the electric golf cart automatically turns off the power converter.

SUMMARY

Unfortunately, there are deficiencies to the above-described conventional approach to simply supplying electric charge to the rechargeable battery of the electric golf cart until the amount of charge stored within the rechargeable battery reaches the full target threshold. For example, suppose that the power converter charges the rechargeable battery to the full target threshold while the electric golf cart is at the top of a hill. Additionally, suppose that a driver then invokes regenerative braking while driving the electric golf cart off the top of the hill. In such a situation, regenerative braking may unnecessarily supply charge to the rechargeable battery leading to an overvoltage event. To safeguard the rechargeable battery against the overvoltage event, circuitry within the electric golf cart may even disconnect (or remove access to) the rechargeable battery leading to driver dissatisfaction.

One approach to addressing such deficiencies is to set the charging threshold to be less than the full state of charge of the rechargeable battery. In this situation, the power converter does not charge the rechargeable battery to the full state of charge, but instead charges the rechargeable battery to less than the full state of charge. Accordingly, when the electric golf cart is driven away from the top of the hill, regenerative braking is able to supply charge to the rechargeable battery without causing an overvoltage event.

However, in this situation, the charging threshold is persistently lowered to less than the full state of charge. Accordingly, if the electric golf cart is recharged at a different location such as at the bottom of the hill, the electric golf cart is again recharged to less than the full state of charge. As a result, the electric golf cart is always operated in a sub-optimal manner and the rechargeable battery is never utilized at a full state of charge.

Advantageously, improved techniques are directed to selectively providing early charge termination to a utility vehicle based on location. For example, a traction power source that provides electric power for electric propulsion may recharge to a first charge threshold when the utility vehicle is in a first geographic area, and to a second charge threshold when the utility vehicle is in a second geographic area. In some arrangements, the utility vehicle is equipped with global positioning system (GPS) circuitry which enables the utility vehicle to detect whether the utility vehicle is recharging within an early charge termination geofence to enable early charge termination. Such improved techniques are thus able to accommodate certain situations such as when the utility vehicle is recharged at the top of a hill (e.g., recharge to a reduced amount of charge) versus when the utility vehicle is recharged at the bottom of a hill (e.g., recharge to a full amount of charge).

Along these lines, when the utility vehicle is recharged at the top of a hill, specialized circuitry may recharge the traction power source to a charge threshold that leaves remaining charging margin. Accordingly, when a user invokes regenerative braking when driving away from the top of the hill, such regenerative braking will consume the charging margin and avoid causing an overvoltage event.

Furthermore, when the utility vehicle is recharged at the bottom of a hill, specialized circuitry may recharge the traction power source to a higher charge threshold (e.g., to a full state of charge). Accordingly, when a user drives from the bottom of the hill, the utility vehicle will be able to operate with more charge.

One embodiment is directed to a utility vehicle which includes a battery management system (BMS) having a lithium battery. The utility vehicle further includes a utility vehicle propulsion system constructed and arranged to provide utility vehicle propulsion using electric power from the lithium battery. The utility vehicle further includes electronic circuitry coupled with the BMS and the utility vehicle propulsion system. The electronic circuitry is constructed and arranged to perform a method of:

(A) receiving a geolocation signal which identifies a current location of the utility vehicle, (B) generating a geolocation assessment result indicating whether the utility vehicle is currently within an early charge termination geographic area based on the geolocation signal, and (C) charging the battery in accordance with the geolocation assessment result, the battery being charged to a first charge threshold when the geolocation assessment result indicates that the utility vehicle is currently not within the early charge termination geographic area, and the battery being charged to a second charge threshold when the geolocation assessment result indicates that the utility vehicle is currently within the early charge termination geographic area.

The second charge threshold is different from the first charge threshold.

Another embodiment is directed to electronic circuitry to charge a battery of a utility vehicle. The electronic circuitry includes a communications interface constructed and arranged to couple with charge control circuitry and the battery of the utility vehicle, the electronic circuitry further includes a controller coupled with the communications interface. The controller is constructed and arranged to perform a method of:

(A) receiving a geolocation signal which identifies a current location of the utility vehicle, (B) generating a geolocation assessment result indicating whether the utility vehicle is currently within an early charge termination geographic area based on the geolocation signal, and (C) via communication through the communications interface, charging the battery in accordance with the geolocation assessment result, the battery being charged to a first charge threshold when the geolocation assessment result indicates that the utility vehicle is currently not within the early charge termination geographic area, and the battery being charged to a second charge threshold when the geolocation assessment result indicates that the utility vehicle is currently within the early charge termination geographic area. The second charge threshold is different from the first charge threshold.

Yet another embodiment is directed to a method of charging a battery of a utility vehicle. The method includes:
(A) receiving a geolocation signal which identifies a current location of the utility vehicle;
(B) generating a geolocation assessment result indicating whether the utility vehicle is currently within an early charge termination geographic area based on the geolocation signal; and
(C) charging the battery in accordance with the geolocation assessment result, the battery being charged to a first charge threshold when the geolocation assessment result indicates that the utility vehicle is currently not within the early charge termination geographic area, and the battery being charged to a second charge threshold when the geolocation assessment result indicates that the utility vehicle is currently within the early charge termination geographic area.

The second charge threshold being different from the first charge threshold.

In some arrangements, the first charge threshold is a first amount of charge. Additionally, the second charge threshold is a second amount of charge that is lower than the first amount of charge.

In some arrangements, the first amount of charge is a first percentage of battery capacity. Additionally, the second amount of charge is a second percentage of battery capacity the that is lower than the first percentage of battery capacity.

In some arrangements, the battery is constructed and arranged to operate as a traction power source that provides electric power for utility vehicle propulsion.

In some arrangements, charge control circuitry is coupled with the battery, the charge control circuitry storing the first charge threshold as a maximum charge limit for the battery and being constructed and arranged to limit charging of the battery to the maximum charge limit. Additionally, charging the battery in accordance with the geolocation assessment result includes, in response to the geolocation assessment result indicating that the utility vehicle is currently within the early charge termination geographic area, reconfiguring the charge control circuitry to use the second charge threshold as the maximum charge limit for the battery in place of the first charge threshold.

In some arrangements, generating the geolocation assessment result includes:
(i) detecting that the utility vehicle currently resides within a geofence based on the geolocation signal, and
(ii) based on geofence data for the geofence, detecting that the geofence is an early charge termination type of geofence.

In some arrangements, the geolocation signal includes a GPS coordinate which identifies the current location of the utility vehicle. Additionally, detecting that the utility vehicle currently resides within the geofence includes ascertaining that the GPS coordinate is among a plurality of GPS coordinates defining the geofence.

In some arrangements, a GPS device couples with the charge control circuitry. Additionally, ascertaining that the GPS coordinate is among the plurality of GPS coordinates defining the geofence and detecting that the geofence is the early charge termination type of geofence are performed within the GPS device. Furthermore, reconfiguring the charge control circuitry includes providing a reconfiguration command from the GPS device to the charge control circuitry to override the first charge threshold with the second charge threshold.

In some arrangements, the charge control circuitry resides within a motor controller constructed and arranged to operate a traction motor of the utility vehicle and a BMS constructed and arranged to manage access to the battery. Additionally, reconfiguring the charge control circuitry includes providing a reconfiguration command to the motor controller that directs the motor controller to use the second charge threshold as the maximum charge limit for the battery in place of the first charge threshold.

In some arrangements, the motor controller couples with the BMS via a controller area network (CAN) bus. Additionally, providing the reconfiguration command to the motor controller causes the motor controller to broadcast a CAN message on the CAN bus to the BMS directing the BMS to terminate charging of the battery when the motor controller senses that the battery has charged to the second charge threshold.

In some arrangements, providing the reconfiguration command to the motor controller further causes the BMS to provide a charge termination signal to a battery charger that charges the battery. The charge termination signal directs the battery charger to terminate charging of the battery.

In some arrangements, providing the reconfiguration command to the motor controller that directs the motor controller to use the second charge threshold as the maximum charge limit for the battery in place of the first charge threshold occurs while the utility vehicle is stationary and the BMS is providing access to the battery to enable battery charging.

Other embodiments are directed to systems, subsystems, apparatus, assemblies, and so on. Some embodiments are directed to various methods, componentry, platforms, crafts, etc. which are involved in selective early charge termination.

BRIEF DESCRIPTION OF THE DRAWINGS

The foregoing and other objects, features and advantages will be apparent from the following description of particular embodiments of the present disclosure, as illustrated in the accompanying drawings in which like reference characters refer to the same parts throughout the different views. The drawings are not necessarily to scale, emphasis instead being placed upon illustrating the principles of various embodiments of the present disclosure.

DETAILED DESCRIPTION

An improved technique is directed to selectively providing early charge termination to a utility vehicle based on location. Along these lines, a rechargeable traction power source that provides electric power for electric propulsion may recharge to a first charge threshold when the utility vehicle is in a first geographic area, and to a second charge threshold when the utility vehicle is in a second geographic area. In some arrangements, the utility vehicle is equipped with global positioning system (GPS) circuitry which enables the utility vehicle to detect whether the utility vehicle is recharging within an early charge termination geofence that imposes early charge termination (e.g., charging terminates with remaining charging margin still available). Such an improved technique is thus able to accommodate certain situations such as when the utility vehicle is recharged at the top of a hill (e.g., reduced charging prevents regenerative braking from causing an overvoltage event) versus when the utility vehicle is recharged at the bottom of a hill (e.g., greater charging optimizes use of the rechargeable power source).

The various individual features of the particular arrangements, configurations, and embodiments disclosed herein can be combined in any desired manner that makes technological sense. Additionally, such features are hereby combined in this manner to form all possible combinations, variants and permutations except to the extent that such combinations, variants and/or permutations have been expressly excluded or are impractical. Support for such combinations, variants and permutations is considered to exist in this document.

Figure 1:
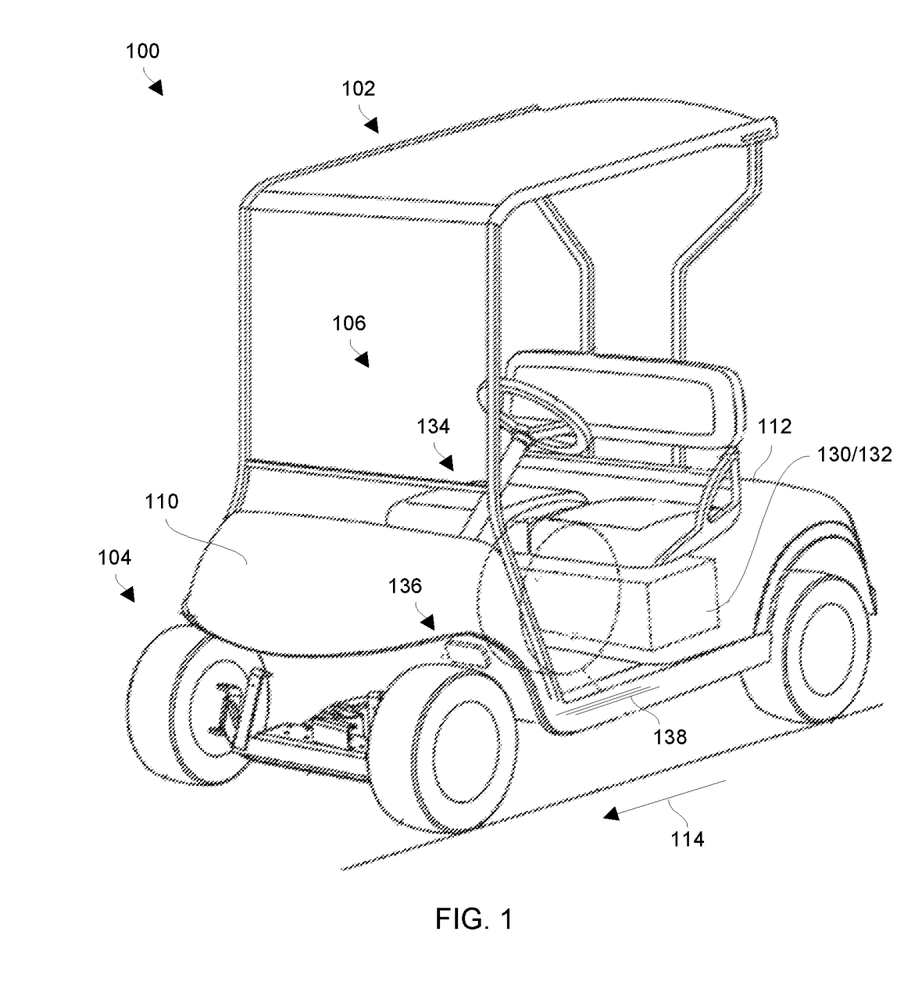
FIG. 1 is a diagram of an example utility vehicle which provides selective early charge termination in accordance with certain embodiments.

FIG. 1 is a diagram of an example utility vehicle 100 which provides selective early charge termination in accordance with certain embodiments. The utility vehicle 100 includes a utility vehicle body 102 (e.g., a chassis, a frame, etc.), a set of engagement members 104 (e.g., a set of tires), and a motion control system 106. It should be understood that the utility vehicle 100 has the form factor of a golf car by way of example only and that other utility vehicle form factors are suitable for use as well such as those of personnel and/or cargo transport vehicles, food and beverage vehicles, hospitality vehicles, all-terrain vehicles (ATVs), utility task vehicles (UTVs), tracked vehicles, larger specialized equipment and/or application vehicles, motorcycles, scooters, as well as other lightweight and/or special purpose vehicles.

The utility vehicle body 102 defines a vehicle front 110 and a vehicle back 112. Accordingly, when the utility vehicle 100 moves forward, the utility vehicle 100 is considered to move in a front-to-back direction (see arrow 114).

The set of engagement members 104 is constructed and arranged to interact with the environment to move the utility vehicle 100. It should be understood that various types of engagement members 104 are suitable for use (e.g., tires/wheels, tracks, rails, combinations thereof, etc.) depending on the type of environment or terrain (e.g., a road, dirt, brush, snow, ice, marsh, etc.).

The motion control system 106 is constructed and arranged to control vehicle movement such as drive provided by the set of engagement members 104, speed control, braking, and so on thus enabling the utility vehicle 100 to effectively maneuver and perform useful work. The motion control system 106 may include, among other things, a motor system 130, a battery management system 132, and additional components 134 such as a set of user controls 136 (e.g., foot pedals, transmission control, a keyed switch, a maintenance switch, additional levers/knobs/etc.), cabling 138, and so on.

It should be understood that certain components of the motor control system 106 (or portions thereof) may be disposed within a set of compartments (in one or more compartments) under a set of seats (under one or more seats) of the utility vehicle 100. For example, a compartment underneath a seat of the utility vehicle 100 may house one or more rechargeable batteries, control circuitry, cabling, controls, etc. for ease of access/serviceability, to protect passengers, for protection against damage, for security, and so on. Other locations are suitable for use as well such as under a hood, under a rear bed, etc.

It should be further understood that the motion control system 106 includes other apparatus/components as well. Along these lines, the motion control system 106 further includes a drivetrain (e.g., a set of gears, linkage, differential, etc.) that connects the motor system 130 to the set of engagement members 104 (e.g., two drive wheels and two non-drive wheels), a steering wheel (or column), a steering gear set that connects the steering wheel to certain engagement members 104, a set of brakes, other controls and sensors, and so on.

As will be explained in further detail shortly, the utility vehicle 100 includes an electric traction motor which runs on electric power from a rechargeable battery for propulsion, and which provides regenerative braking to recharge the rechargeable battery. Moreover, the utility vehicle 100 is configured to perform selective early charge termination in which recharging of the rechargeable battery may terminate early based on the current location of the utility vehicle 100. For example, when the utility vehicle 100 recharges at the top of a mountain or steep hill, recharging of the rechargeable battery may terminate early to leave the rechargeable battery with remaining charge margin. Accordingly, if the utility vehicle 100 is driven off the top of the mountain and regenerative braking is applied, the rechargeable battery will be able to accept further charge from regenerative braking and thus avoid an overvoltage event. Further details will now be provided with reference to FIG. 2.

Figure 2:
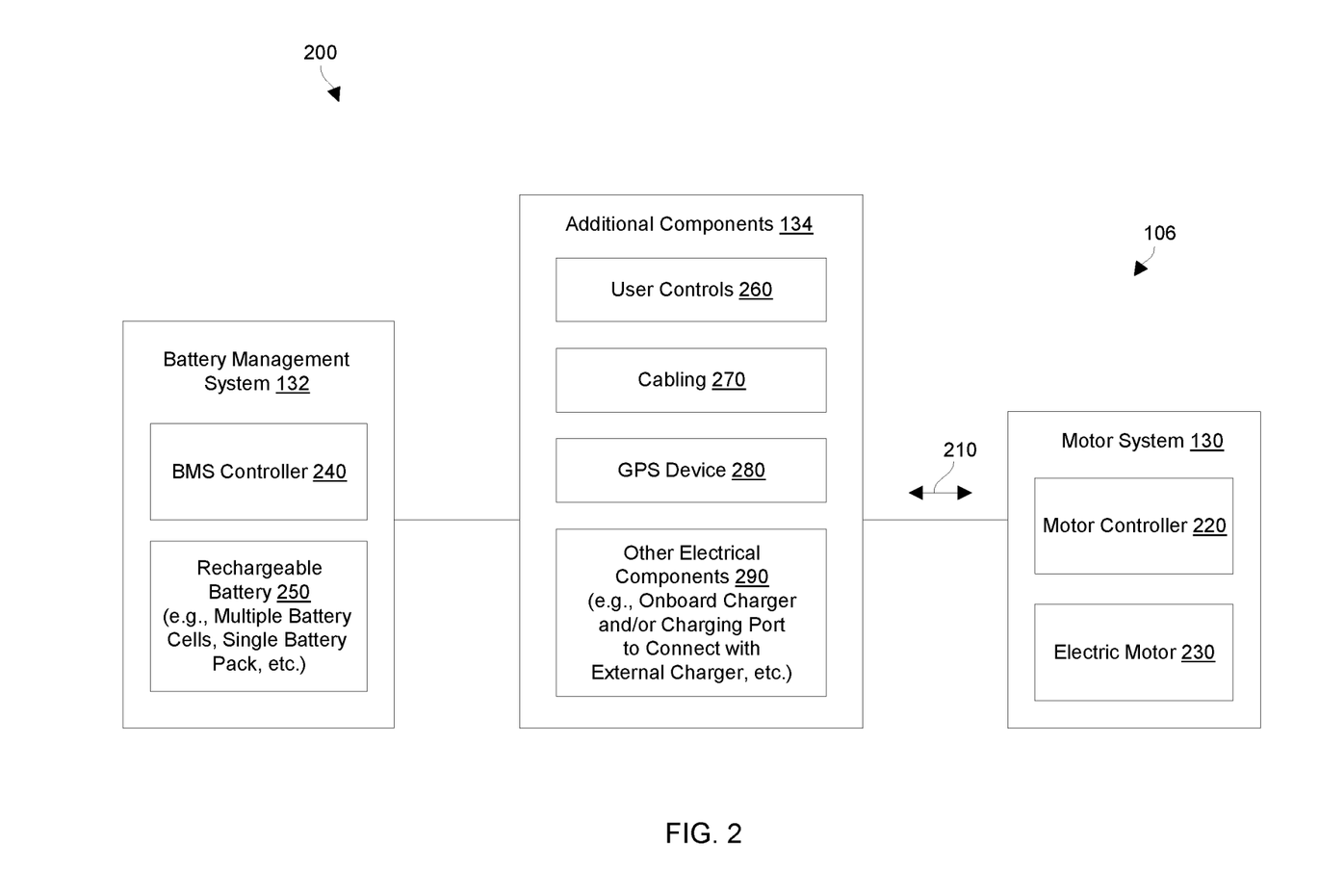
FIG. 2 is a block diagram of certain portions of the example utility vehicle in accordance with certain embodiments.

FIG. 2 is a view 200 of at least a portion of the motion control system 106 of the utility vehicle 100 (also see FIG. 1) in accordance with certain embodiments. As shown in FIG. 2, the motor system 130, the battery management system (BMS) 132, and the additional components 134 are coupled with each other (e.g., via power buses, communications buses, etc.) and exchange electrical signals 210 (e.g., power signals, control/status signals, sensor signals, and so on). The motor system 130 includes a motor controller 220 and an electric traction motor 230 (or simply electric motor 230) coupled with the motor controller 220. The BMS 132 includes a BMS controller 240 and a rechargeable battery (or rechargeable traction power source) 250 coupled with the BMS controller 240. The additional components 134 refer to various componentry coupled with the motor system 130 and/or the battery management system 132 such as user controls 260 (e.g., switches, pedals, etc.), cabling 270 (e.g., power cables, communications buses, etc.), a GPS device (or circuit) 280, and various other components 290 (e.g., an onboard charger and/or a charging receptacle to connect with an external charger, lights, one or more inertial measurement units, specialized equipment, other loads, etc.). In some arrangements, various components of the motion control system 106 communicate through a controller area network (CAN) bus via electronic CAN messages in accordance with the CAN protocol.

The motor controller 220 of the motor system 130 is constructed and arranged to control delivery of stored electric energy from the BMS 132 to the electric motor 230 which ultimately operates at least some of the engagement members 104 to move the utility vehicle 100. Additionally, the motor controller 220 operates the electric motor 230 to provide regenerative braking in which the electric motor 230 converts kinetic energy of the moving utility vehicle 100 into electrical energy to recharge the rechargeable battery 250 (e.g., during braking, while the utility vehicle 20 coasts downhill, during accelerator pedal release, etc.). To this end, the motor controller 220 and/or the additional components 134 may be provisioned with a battery system interface that enables the motor controller 220 to robustly and reliably connect with and communicate with the BMS 132.

In accordance with certain embodiments, the various other components 290 of the motion control system 106 enable recharging of the rechargeable battery 250. The charger may be onboard or externally coupled to the utility vehicle 100 through a charging port (e.g., when the utility vehicle 100 is parked and connected to an external charger at a charging station).

In particular, when the charger is recharging the rechargeable battery 250, the motor controller 220 compares the current charge level (or current state of charge) of the rechargeable battery 250 with a default charge threshold. Such a default charge threshold may be stored in non-volatile (or persistent) memory within the motor controller 220. In some arrangements, the default charge threshold is a factory setting, or a predefined setting which is established upfront prior to routinely operating the utility vehicle 100 (e.g., set by a user).

When the motor controller 220 detects that the current charge level of the rechargeable battery 250 is at or above the default charge threshold, the motor controller 220 sends a notification signal to the BMS 132 indicating that charging should terminate. In some arrangements in which the motor controller 220 and the BMS 132 connect with a CAN bus, the motor controller 220 sends the notification signal as a broadcasted bit on the CAN bus.

When the BMS 132 detects this signal from the motor controller 220, the BMS 132 sends another signal to the charger that directs the charger to terminate the charging process. In some arrangements in which the charger is onboard and connects with the CAN bus, the BMS 132 may send a termination message to the onboard charger. In other arrangements in which the charger is external to the utility vehicle 100, the BMS 132 may send a termination signal to the external charger through the same charging port through which the external charger charges the rechargeable battery 250. Other communication methodologies are suitable for use as well such as wireless signals, out-of-band signals (e.g., signals over network cables, dedicated lines, etc.), combinations thereof, etc.

When the charger receives the charge termination signal from the BMS 132, the charger stops supplying electric charge to the rechargeable battery 250. In some arrangements, the utility vehicle 100 may provide an indication that charging has finished (e.g., output an audio tone, light an LED, send a signal to fleet management server, combinations thereof, etc.).

As will be explained in further detail shortly and in accordance with certain embodiments, the motion control system 106 of the utility vehicle 100 is equipped to perform selective early charge termination based on location. In particular, the GPS device 280 is constructed and arranged to monitor the current location of the utility vehicle 100 and, if the utility vehicle 100 is recharging while in a geofenced region that is identified as an early charge termination geofence, the GPS device 280 overrides the default charge threshold with a reduced charge threshold such that charging of the rechargeable battery 250 terminates early (e.g., charging terminates at a lower level than the default charge threshold). Such charging of the rechargeable battery 250 to this reduced level leaves the rechargeable battery 250 with further charging margin. Accordingly, the rechargeable battery 250 is able to accept subsequent charging from regenerative braking without causing an overvoltage event.

It should be understood that a variety of metrics are suitable for charge thresholds. Examples of charge thresholds include a percentage of battery capacity, Ampere-Hours (Ah), other units for amounts of charge and/or battery capacity, and the like. Further details will now be provided with reference to FIG. 3.

Figure 3:
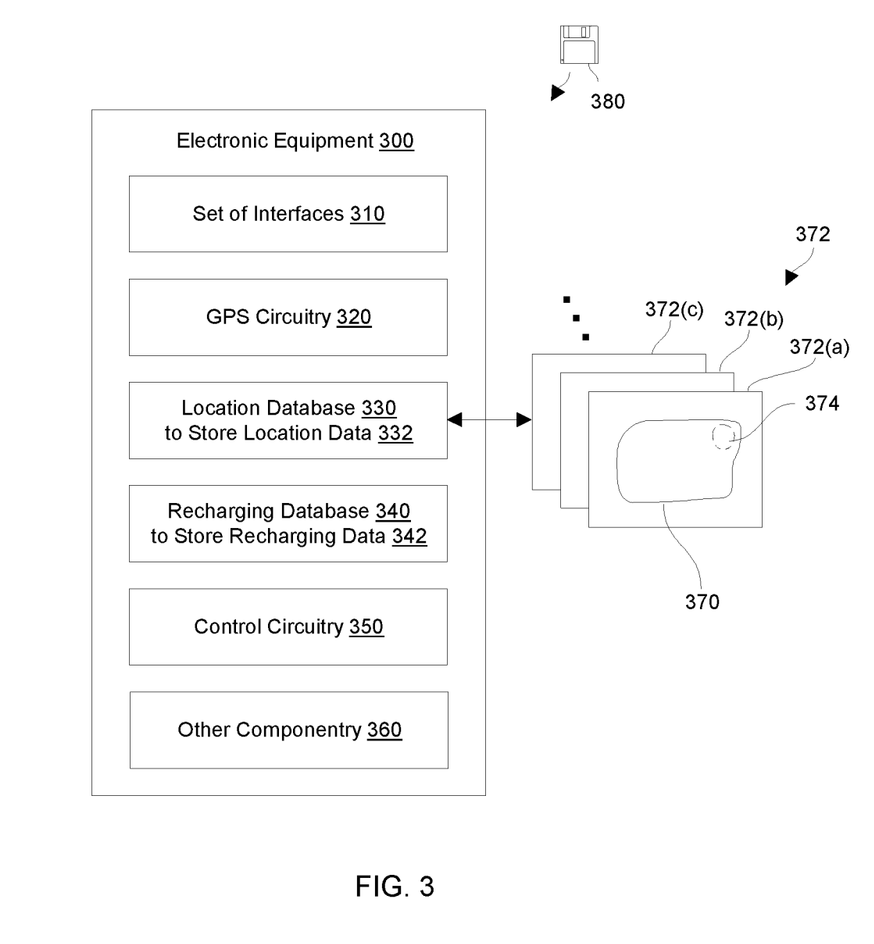
FIG. 3 is a block diagram of certain electronic equipment in accordance with certain embodiments.

FIG. 3 shows, in accordance with certain embodiments, electronic equipment 300 which is suitable for use as the GPS device (or circuit) 280 (also see FIG. 2). As shown in FIG. 3, the electronic equipment 300 includes a set of interfaces 310, GPS circuitry 320, a location database 330 to store location data 332, a recharging database 340 to store recharging data 342, control circuitry 350, and other componentry 360.

The set of interfaces 310 enables the electronic equipment 300 to communicate with other components of the motion control system 106 of the utility vehicle 100 (also see FIG. 2). Along these lines, the set of interfaces 310 may include one or more network interfaces (e.g., a wireless transceiver, network card, etc.) to enable the electronic equipment 300 to communicate with other equipment/devices/etc. of the motion control system 106 (also see FIG. 2). Alternatively or additionally, the set of interfaces 310 may include other types of interfaces such as specialized or custom circuitry to interface with specialized equipment (e.g., a wireless interface to connect with an external base station or to provide cellular connectivity, a power port to connect with an external charger, a CAN bus interface, combinations thereof, etc.).

The GPS circuitry 320 is constructed and arrange to identify a current GPS location (e.g., GPS coordinates) of the electronic equipment 300. Accordingly, when the electronic equipment 300 is installed as part of the motion control system 106 of the utility vehicle 100, the GPS circuitry 320 is able to identify the current GPS location of the utility vehicle 100.

The location database 330 is constructed and arranged to store location data 332 for one or more geographic regions 370 traversable by the utility vehicle 100 (e.g., a campus, a gated community or village, a golf course, other mapped regions, combinations thereof, etc.). Along these lines, the location data 332 may include a set of geofencing entries 372(*a*), 372(*b*), 372(*c*), . . . (collectively, geofencing entries 372). The geofencing entries 372 define respective geofences 374, i.e., geographic areas within the geographic region 370 which are defined by virtual boundaries or perimeters within and within which the utility vehicle 100 may reside from time to time.

It should be understood that the geofencing entries 372 for the geofences 374 may define grids (or arrays of cells/coordinates) of adjacent GPS locations. Here, at least some of the GPS locations within the grids are marked as belonging to the geofences 374 (i.e., as being inside the geofences 374), and other GPS locations are marked as not belonging to the geofences 374 (i.e., as being outside the geofences 374).

It should be further understood that when the GPS circuitry 320 identifies the current GPS location of the utility vehicle 100, the current GPS location may be compared to the geofencing entries 372 to determine whether the utility vehicle 100 currently resides within any of the geofences 374. That is, when the utility vehicle 100 moves into a GPS location that is marked as belonging to the geofence 374, the utility vehicle 100 may be considered as being in (or having entered) the geofence 374. If the utility vehicle 100 moves into another GPS location that is marked as belonging to the geofence 374, the utility vehicle is considered to still reside in the geofence 374. However, when the utility vehicle 100 moves out of that GPS location and into a GPS location that marked as not belonging to the geofence 374, the utility vehicle 100 is considered as no longer being in (or having exited) the geofence 374.

At this point, it should be understood that the geofencing entries 372 may define the geofences 374 as early charge termination type geofences 374 or regular charge termination type geofences 374. If the utility vehicle 100 is recharging its rechargeable battery 250 (also see FIG. 2) within an early charge termination type of geofence 374, recharging terminates early (e.g., below a full charge threshold such that charging margin still remains). However, if the utility vehicle 100 is recharging its rechargeable battery 250 within a regular charge termination type of geofence 374, recharging terminates normally (e.g., at the full charge threshold).

It should be understood that geofencing was described above as leveraging GPS by way of example only and that other geofencing technologies are suitable for use as well. For example, in other embodiments, the geofences 374 may be associated with or defined by Bluetooth beaconing, RF readers, combinations thereof, and so on.

The recharging database 340 is constructed and arranged to maintain recharging information 342 that defines recharging details for the geofencing entries 372 defining the geofences 374. Such recharging information 342 may include maximum recharging levels for various geofences 374 (e.g., 80% for geofence A, 75% for geofence B, 95% for geofence C, etc.), recharging logs indicating charging/discharging behaviors, records of overvoltage faults/events, etc.

The control circuitry 350 of the electronic equipment 300 is constructed and arranged to perform one or more operations involved in selectively providing early charge termination to a utility vehicle 100 based on location. Such operation may include identifying a current location of the utility vehicle 100. Additionally, such operation may include ascertaining that the utility vehicle 100 is currently recharging within an early charge termination geofence 374. Furthermore, such operation may include communicating with the motor controller 220 of the motor system 130 (also see FIG. 2) to terminate recharging early such that a certain amount of charging margin remains available (e.g., override a default charge threshold used by the motor controller 220 with a reduced charge threshold such that charging of the rechargeable battery 250 terminates at a lower level than the default charge threshold).

In some arrangements, the control circuitry 350 accesses the recharging database 340 to determine a particular reduced charge threshold for the particular geofence 374 within which the utility vehicle 100 currently resides. That is, the recharging database 340 stores respective reduced charge thresholds for different early charge termination geofences 374. Once the control circuitry 350 obtains the correct reduced charge threshold from the recharging database 340, the control circuitry 350 provides the reduced charge threshold to the motor controller 220 of the motor system 130 through the set of interfaces 310 (recall that the motor controller 220 monitors charging and controls charge termination).

Such operation enables the control circuitry 360 effectively recharge the battery 250 of the utility vehicle 100 leaving charging margin. Accordingly, if the utility vehicle 100 is in an area where it normally performs regenerative braking shortly after leaving the charging area, the battery 250 of utility vehicle 100 will be able to accept the additional charge from regenerative braking and avoid an overvoltage event.

It should be appreciated that the control circuitry 240 may be implemented in a variety of ways such as via one or more processors (or cores) running specialized software stored in non-volatile memory, application specific ICs (ASICs), field programmable gate arrays (FPGAs) and associated programs, discrete components, analog circuits, other hardware circuitry, combinations thereof, and so on. In the context of one or more processors (and/or other types of computerized circuitry) executing software, a computer program product 380 is capable of delivering all or portions of the specialized software to the electronic equipment 300. In particular, the computer program product 380 includes a non-transitory (or non-volatile) computer readable medium which stores a set of instructions that controls one or more operations of the electronic equipment 300. Examples of suitable computer readable storage media include tangible articles of manufacture and apparatus which store instructions in a non-volatile manner such as DVD, CD-ROM, flash memory, disk memory, tape memory, combinations thereof, and the like.

The other componentry 360 of the electronic equipment 300 refers to additional features/components that may belong to the electronic equipment 300. Along these lines, the electronic equipment 300 may have a time clock, a local set of user input/output (I/O) devices (e.g., a touchscreen or similar display, a keyboard, a mouse, a microphone, LEDs, a speaker, etc.), and so on.

In some arrangements, the electronic equipment 300 is provided as a modular device which couples with the other components of the motion control system 106 (e.g., by connecting to a CAN bus of the utility vehicle 100). Accordingly, legacy utility vehicles may be conveniently upgraded without extensive modifications, redesigns, and so on.

In other arrangements, the electronic equipment 300 is more tightly integrated with the other components of the motion control system 106 (e.g., by sharing certain resources such as the same housing/enclosure and/or circuits as that of the motor controller 220, by residing on the same circuit board as other processing circuitry of the utility vehicle 100, etc.). Accordingly, new utility vehicles may share infrastructure to reduce/eliminate redundancy, waste, etc.

In some arrangements, the electronic equipment 300 is constructed and arranged to perform a variety of other operations. Such operations may include outputting alerts when the utility vehicle 100 is in a restricted or hazardous area, providing weather information, communicating with a base station, and so on. In the context of a specialized vehicle such as a golf cart, the electronic equipment 300 may display, based on current GPS locations, current golf holes, entire hole distances, distances from the utility vehicle 100 to the pins, pace of play, etc. Further details will now be provided with reference to FIGS. 4 and 5.

Figure 4:
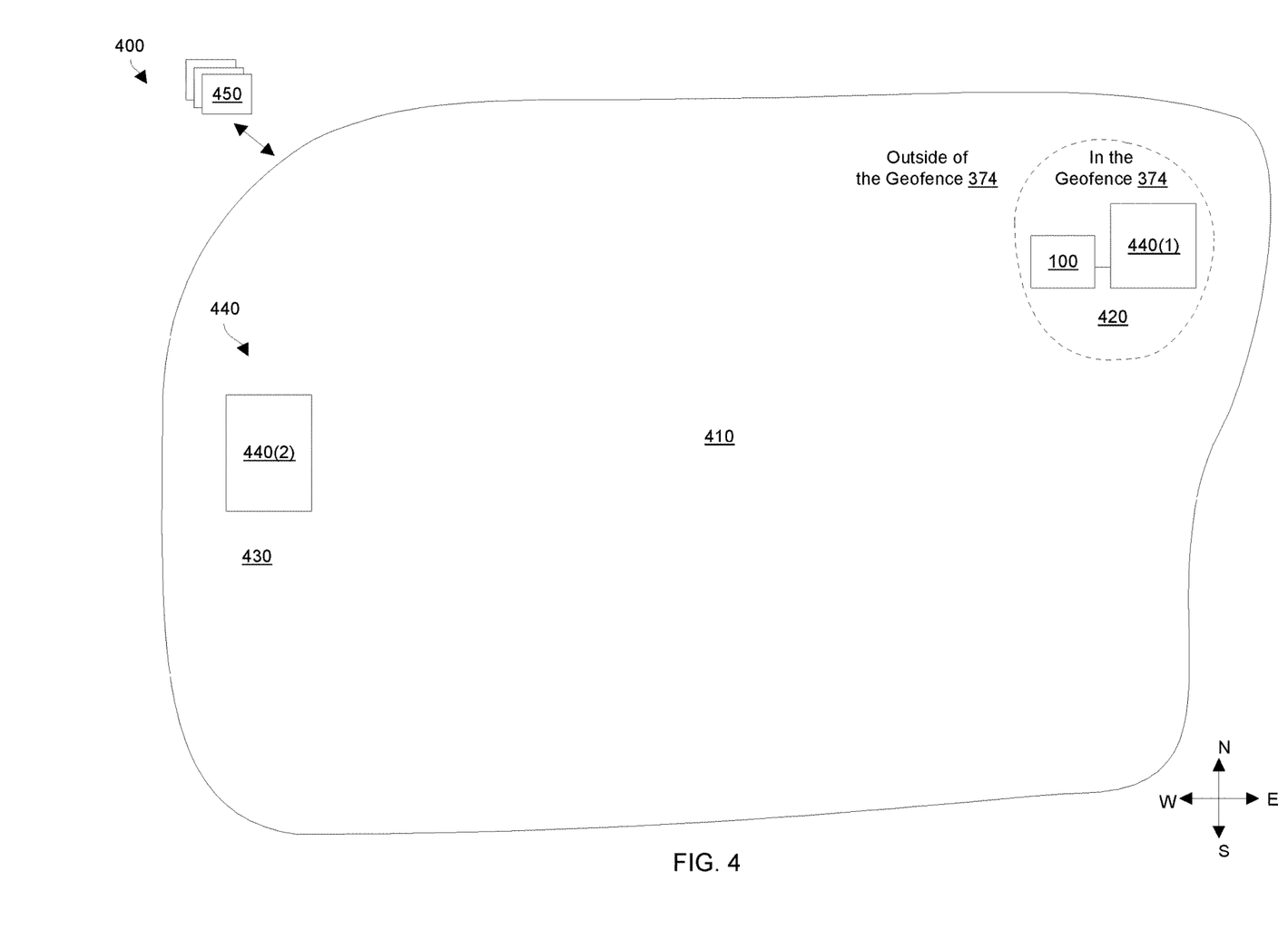
FIG. 4 is first view of an example environment which is suitable for selective early charge termination in accordance with certain embodiments.
Figure 5:
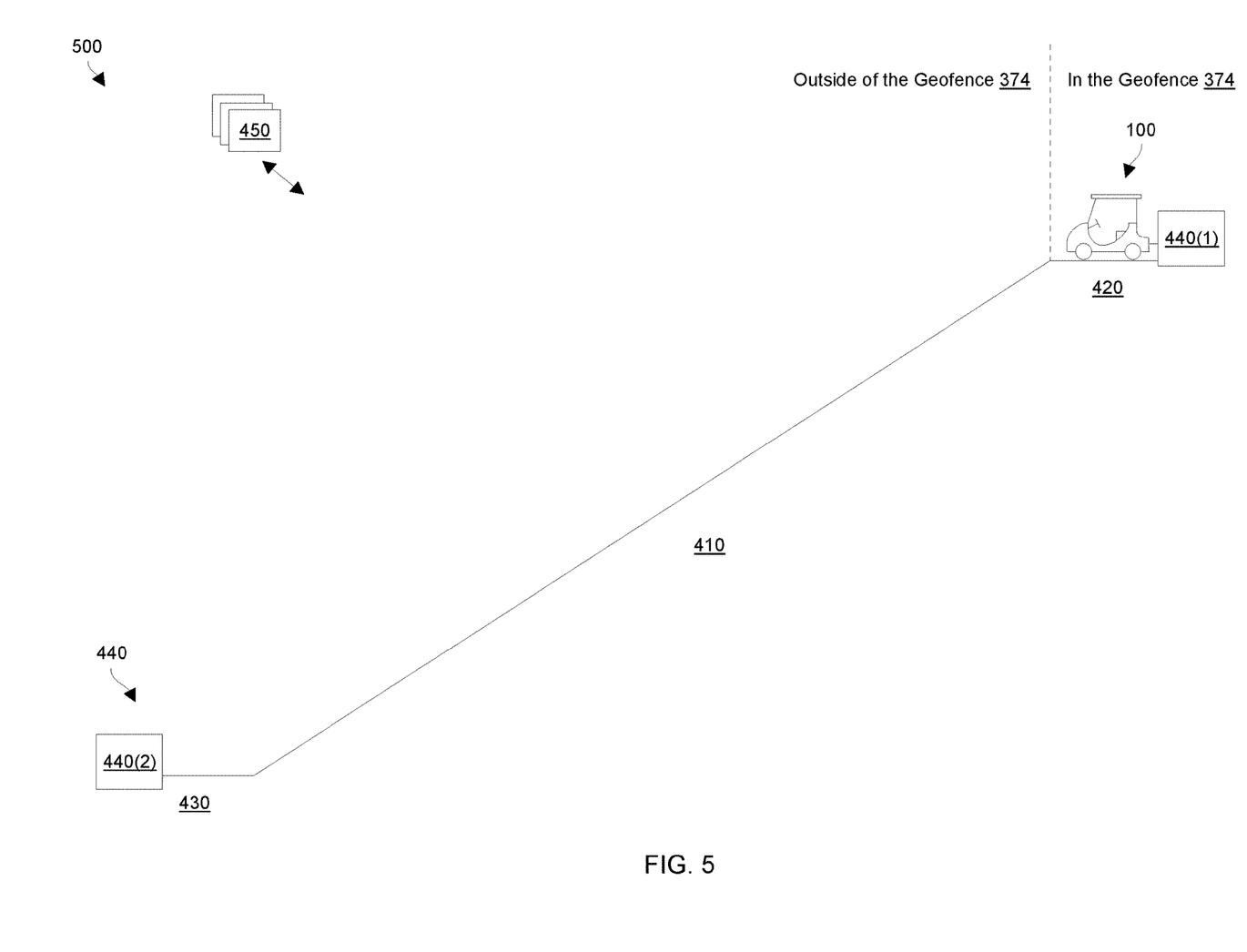
FIG. 5 is second view of the example environment which is suitable for selective early charge termination in accordance with certain embodiments.

FIGS. 4 and 5 show an example of selective early charge termination based on location in accordance with certain embodiments. FIG. 4 is an overhead (or aerial) view 400 of an example environment. FIG. 5 is a side elevation (or ground) view 500 of the example environment.

As shown in the views 400 and 500 of FIGS. 4 and 5, the example environment includes an early charge termination type of geofence 374. As mentioned earlier in connection with FIG. 3, such a geofence 374 may be defined by location data 332 stored within the location database 330 of the electronic equipment 300 (also see FIG. 3).

By way of example and as best seen in the overhead view 400 of FIG. 4, the early charge termination type of geofence 374 is situated in a northeast section of the example environment. Also by way of example and as best seen in the side elevation view of FIG. 5, the example environment includes an incline/grade (or hill) 410, an elevated area 420 at a top of the incline 410, and a low lying area 430 at a bottom of the incline 410.

Additionally, the example environment includes a first charging station 440(1) and a second charging station 440(2) (collectively, charging stations 440). The first charging station 440(1) is within the geofence 374 at the elevated area 420 at the top of the incline 410. The second charging station 440(2) is outside the geofence 374 at the low lying area 430 at the bottom of the incline 410. Such charging stations 440 may be constructed and arranged to continue to supply charge to charge a utility vehicle 100 until the utility vehicle 100 outputs a command to terminate supplying charge.

Furthermore, the example environment may be within range of one or more remote resources 450 for subscription services which are accessible via respective portals. Such subscription services may be enabled and/or disabled at any time (e.g., toggled on/off by a user after enrollment). Such remote resources 450 may periodically communicate with the utility vehicle 100 (e.g., wirelessly via the electronic equipment 300, also see FIG. 3) to obtain information, provide information, etc.

It should be understood that, when the utility vehicle 100 drives from the elevated area 420 down the incline 410, the utility vehicle 100 may perform regenerative braking to slow the utility vehicle 100. Such regenerative braking may provide charge to the rechargeable battery 250 (FIG. 2).

If the rechargeable battery 250 has charging margin during this regenerative braking, the rechargeable battery 250 is able to accept charge from this regenerative braking. However, if the rechargeable battery 250 has little to no charging margin during this regenerative braking (e.g., due to receiving a full charge from a charging station 440), the rechargeable battery 250 will not be able to accept charge from this regenerative braking and an overvoltage event may occur.

To prevent such an overvoltage event, the utility vehicle 100 employs selective early charge termination based on location. Along these lines, the electronic equipment 300 of utility vehicle 100 (FIG. 3) determines whether the utility vehicle 100 is currently within the early charge termination type of geofence 374 and whether the rechargeable battery 250 is being recharged (e.g., from the first charging station 440(1)). If this situation exists (e.g., see FIG. 5), the electronic equipment 300 coordinates with the motor controller 220 of the motor system 130 to terminate recharging early at an early charge termination threshold such that a predefined amount of charging margin remains available. Such a predefined amount of charging margin enables the rechargeable battery 250 to accept charging from regenerative braking while the utility vehicle 100 is driven from the elevated area 420 down the incline 410.

On the other hand, suppose that the utility vehicle 100 is being recharged at the low lying area 430 at the bottom of the incline 410 (e.g., from the second charging station 440(2)). In this situation, the utility vehicle 100 is not within an early charge termination type of geofence 374 (e.g., see FIG. 5). Accordingly, the electronic equipment 300 does not coordinate with the motor controller 220 of the motor system 130 to terminate recharging early. Rather, the motor controller 220 monitors recharging of the rechargeable battery 250 and allows recharging to continue until the rechargeable battery 250 charges to a normal charging threshold which is higher than the early charge termination threshold. Accordingly, the utility vehicle 100 is able to leave the second charging station 440(2) fully charged and thus utilize the full capacity of the rechargeable battery 250.

It should be understood that while the utility vehicle 100 is driven either around the low lying area 430 or up the incline 410, the utility vehicle 100 will consume electric power from the rechargeable battery 250. Accordingly, if the utility vehicle 100 then performs regenerative braking during such use, the rechargeable battery 250 will be able to accept charging from such regenerative braking (charging margin is created during charge consumption) and an overvoltage situation will not occur.

In accordance with certain embodiments, various parameters for selective early charge termination are accessible through a subscription service (also see the remote resources 450 in FIGS. 4 and 5). Along these lines, a user (e.g., an administrator operating a fleet of utility vehicles, an individual, etc.) may subscribe to the subscription service to access tools to create and/or modify custom geofences, to acquire predefined geofences, to setup and/or tune operating aspects and/or other geo-assessment factors, combinations thereof, etc.). Such parameters may be stored locally (e.g., see the electronic equipment 300 in FIG. 3) and/or remotely (e.g., at a central server, in the cloud, etc.).

Moreover, in some arrangements, tools of the subscription service may derive, offer and/or recommend certain parameter values, adjustments, etc. For example, the electronic equipment 300 may store a log of battery performance records (also see the recharging database 340 in FIG. 3). The subscription service may then compute new charge thresholds for respective early charge termination type geofences, suggest and/or automatically deploy new geofences, etc. based on the battery performance records. Such new charge thresholds, geofences, etc. may concurrently optimize battery capacity utilization, prevent overvoltage events, make adjustments routinely over time based on utility vehicle performance, and so on.

In some embodiments, access to the subscription service may be made through a portal on the utility vehicle 100 (e.g., see the other componentry 360 in FIG. 3). For example, the GPS device 280 may include a touchscreen for user input/output (I/O). As another example, the other electrical components 290 may offer I/O access such as a user interface, a physical connector and/or wireless interface for external access, and so on. Moreover, the subscription service and/or certain utility vehicle parameters may further be accessible from one or more other devices (e.g., a general purpose computer, a smart phone, a tablet, other web-based devices, etc.) for enhanced accessibility.

In accordance with certain embodiments, the GPS device 280 may provide the utility vehicle 100 with access to other subscription-based services (again, see the remote resources 450 in FIGS. 4 and 5). Along these lines, the GPS device 280 (and/or other equipment on the utility vehicle 100) may offer access to software-based updates, diagnostics and similar tools, emergency services, navigation services, on-vehicle security and tracking services, and so on. Further details will now be provided with reference to FIG. 6.

Figure 6:
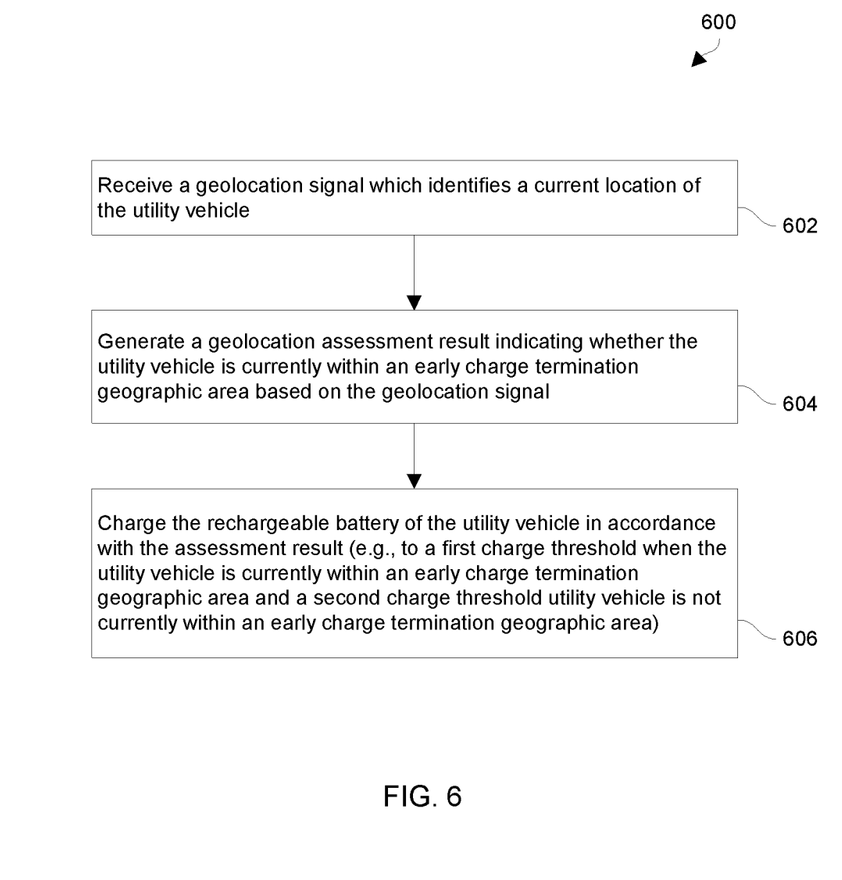
FIG. 6 is a flowchart of a selective early charge termination procedure in accordance with certain embodiments.

FIG. 6 is a flowchart of a procedure 600 to charge a battery of a utility vehicle 100 (also see FIG. 1). In particular, the procedure 600 provides selective early charge termination based on location.

Such a procedure 600 may be performed by specialized circuitry of the utility vehicle 100 such as by a motor controller, a BMS, other circuitry, combinations thereof, etc. (also see FIGS. 2 and 3). Furthermore, such a procedure 600 may be initiated in response to an event such as detection that a rechargeable battery of the utility vehicle 100 has been connected to a charger to be recharged.

At 602, the specialized circuitry receives a geolocation signal which identifies a current location of the utility vehicle. In some arrangements, the geolocation signal is a set of GPS coordinates.

At 604, the specialized circuitry generates a geolocation assessment result indicating whether the utility vehicle is currently within an early charge termination geographic area based on the geolocation signal. In some arrangements, the set of GPS coordinates is compared to a location data defining a set of early charge termination geofences to determine whether the utility vehicle 100 is currently within an early charge termination geofence. If the set of GPS coordinates resides within an early charge termination geofence, the geolocation assessment result indicates that early charge termination is appropriate.

At 606, the specialized circuitry charges the rechargeable battery in accordance with the geolocation assessment result. Along these lines, the rechargeable battery is charged to a first charge threshold when the geolocation assessment result indicates that the utility vehicle is currently not within the early charge termination geographic area. However, the rechargeable battery is charged to a second charge threshold that is lower than the first charge threshold when the geolocation assessment result indicates that the utility vehicle is currently within the early charge termination geographic area.

When the rechargeable battery is charged to the second charge threshold there is more charge margin remaining. Accordingly, after the rechargeable battery has been charged, the rechargeable battery is better configured to accept further charge from regenerative braking.

In accordance with certain embodiments, the motor controller 220 (FIG. 2) is configured to allow the rechargeable battery to charge to the first charge threshold by default (or under normal circumstances such as when the geolocation assessment result indicates that the utility vehicle 100 is not currently within an early charge termination geographic area). However, when the GPS device 280 determines that the utility vehicle 100 is within an early charge termination geofence 374 (also see FIG. 3), the GPS device 280 directs the motor controller 220 to override the first charge threshold with the second charge threshold (i.e., use the second charge threshold in place of the first charge threshold). Along these lines, the GPS device 280 may access a recharging database 340 to find a reduced charge threshold for the particular early charge termination geofence 374 (e.g., see the recharging data 342 in FIG. 3), and provide the reduced charge threshold to the motor controller 220.

In turn, when the charger is recharging the rechargeable battery 250, the motor controller 220 compares the current charge level (or current state of charge) of the rechargeable battery 250 with the reduced charge threshold. When the motor controller 220 detects that the current charge level of the rechargeable battery 250 is at or above the reduced charge threshold, the motor controller 220 sends a notification signal to the BMS 132 indicating that charging should terminate. In some arrangements in which the motor controller 220 and the BMS 132 connect with a CAN bus, the motor controller 220 sends the notification signal as a broadcasted bit on the CAN bus.

When the BMS 132 detects this signal from the motor controller 220, the BMS 132 sends another signal to the charger that directs the charger to terminate the charging process. When the charger receives the charge termination signal from the BMS 132, the charger stops supplying electric charge to the rechargeable battery 250. In some arrangements, the utility vehicle 100 may provide an indication that charging has finished (e.g., output an audio tone, light an LED, send a signal to fleet management server, combinations thereof, etc.).

As described above, improved techniques are directed to selectively providing early charge termination to a utility vehicle 100 based on location. For example, a rechargeable battery 250 that provides electric power for electric propulsion may recharge to a first charge threshold when the utility vehicle 100 is in a first geographic area, and to a second charge threshold when the utility vehicle 100 is in a second geographic area. In some arrangements, the utility vehicle 100 is equipped with GPS circuitry 320 which enables the utility vehicle 100 to detect whether the utility vehicle 100 is recharging within an early charge termination geofence 374 to enable early charge termination. Such improved techniques are thus able to accommodate certain situations such as when the utility vehicle 100 is recharged at the top of a hill/mountain versus when the utility vehicle 100 is recharged at the bottom of the hill/mountain.

While various embodiments of the present disclosure have been particularly shown and described, it will be understood by those skilled in the art that various changes in form and details may be made therein without departing from the spirit and scope of the present disclosure as defined by the appended claims.

One should appreciate that electric vehicles typically feature vehicle speed control via motor speed control. Regulation of electric vehicle speed typically involves regeneration of energy into the vehicle's battery pack when necessary to slow the vehicle down to a desire speed target. This causes battery voltage to rise, and if the voltage rise reaches maximum limit, regenerative braking for speed control will be degraded to protect the vehicle electrical system from overvoltage. The magnitude of voltage rise during regenerative braking is most extreme at high battery state of charge (SOC) and thereby may be mitigated by early charge termination. Specifically, early charge termination allows for targeting a lower battery SOC which, in turn results in lower voltage rise during regenerative braking.

Vehicles in fleet golf, industrial, or commercial applications typically have optional GPS-based fleet management systems for remote vehicle monitoring/management. These fleet management systems can provide a geofencing feature as part of the fleet management application. This feature allows for designating specific geographical areas and establishing certain rules to apply when vehicles enter these areas.

FIG. 2 shows, in accordance with certain embodiments, an example arrangement of an applicable vehicle electrical system in which a GPS device 280 is able to coordinate with a motor system 130 and BMS 132 to effectuate early charge termination. Such GPS position based early charge termination may be effectively implemented in the context of remote fleet/vehicle management, e.g., management of a fleet of lithium vehicles.

Nevertheless, other types electric vehicles could make use of the invention, but may require additional ancillary components. Along these lines, any industry or product that utilizes regeneration from an electric motor or generator could apply the various features, etc. disclosed herein. These would be very useful in scenarios where terminating charge early may aid in controlling battery pack voltage and/or provide benefit to the long-term health of the battery pack.

It should be appreciated that early charge termination comes with the significant trade-off of reducing vehicle range due to not fully charging the battery pack. However, with early charge termination based on location, the vehicle may be fully charged in certain locations to enable full harnessing of vehicle range capabilities.

In accordance with certain embodiments, degraded vehicle speed regulation due to regenerative braking at high battery state of charge (SOC) is specific to applications in unique geographic locations. The applications are characterized by charging locations that are located at higher elevations coupled with vehicle usage from these higher elevations down to much lower elevations such as charging at the top of a mountain, and then driving down to the bottom of the mountain. By applying early charge termination locally based on GPS position in relation to a preconfigured geofence, typically at the top of a significant hill, degradation of regenerative speed regulation can be mitigated only when necessary without universally limiting the vehicle's range in charging situations where early charge termination is not necessary.

In accordance with certain embodiments, a "geofence" area is configured and known by the vehicle's GPS-based fleet management system. The GPS device communicates a charge termination SOC percentage on a vehicle data network based on whether the vehicle's GPS position is within a geofence area that is configured to modify charge termination SOC. If the vehicle is not located in a geofence area, the GPS device would relinquish control of charge termination SOC to the vehicle's default or user-selected charge termination SOC. If the vehicle is not located in an early charge termination geofence area, the GPS device would not intervene in the default charge termination SOC and therefore not penalize vehicle range from early charge termination.

Some arrangements utilize a CAN bus as the vehicle data network. When the GPS device overrides the default or user-selected charge termination SOC via the CAN bus, the motor controller uses this information to determine whether the BMS shall allow charging to continue. Once the vehicle's SOC reaches or exceeds the currently-active end charge SOC (e.g., from the GPS device or the default or user-selected setting depending on current GPS position while charging) the motor controller broadcasts a bit on the CAN bus to indicate that charging is to terminate. Upon receiving this bit over the CAN bus, the BMS asserts a signal to indicate that charging is complete which, in turn, will cause the battery charger to terminate the charging process. This is accomplished via further CAN communications for on board chargers, and via a discrete one-wire communication signal for off board chargers.

Automated early charge termination can be advantageous in golf, utility, or commercial applications. Any similar feature would likely be implemented as a custom charger configuration or algorithm which would be active in all charging scenarios. Before these improvements, this feature has never been selectively implemented based on GPS position or any other dynamic parameters.

It should be appreciated that such improved techniques enable limiting utility vehicle speed based on state of charge. Such techniques allow the utility vehicle to efficiently and effectively perform useful work as well as safeguard the rechargeable battery. Accordingly, such techniques provide an improvement to electric vehicle technology such as improving operability of electric traction motors that access rechargeable batteries.

Nothing precludes the improved techniques from being used in combination with other mechanisms. For example, in some embodiments, the utility vehicle 100 is still provisioned with a burn-off resistor, a mechanical service brake, combinations thereof, etc.

It should be further appreciated that any industry or product that utilizes regeneration from an electric motor or generator can apply the improvements disclosed herein. Such applications may be to other types of vehicles (e.g., aircraft, watercraft), hybrid vehicles, and so on. Such modifications and enhancements are intended to belong to various embodiments of the disclosure.

What is claimed is:

1. A method of charging a battery of a utility vehicle, the method comprising:
   receiving a geolocation signal which identifies a current location of the utility vehicle;
   generating a geolocation assessment result indicating whether the utility vehicle is currently within an early charge termination geographic area based on the geolocation signal; and
   charging the battery in accordance with the geolocation assessment result, the battery being charged to a first charge threshold when the geolocation assessment result indicates that the utility vehicle is currently not within the early charge termination geographic area, and the battery being charged to a second charge threshold when the geolocation assessment result indicates that the utility vehicle is currently within the early charge termination geographic area, the second charge threshold being different from the first charge threshold.

2. The method of claim 1 wherein the first charge threshold is a first amount of charge; and
   wherein the second charge threshold is a second amount of charge that is lower than the first amount of charge.

3. The method of claim 2 wherein the first amount of charge is a first percentage of battery capacity; and
   wherein the second amount of charge is a second percentage of battery capacity the that is lower than the first percentage of battery capacity.

4. The method of claim 3 wherein the battery is constructed and arranged to operate as a traction power source that provides electric power for utility vehicle propulsion.

5. The method of claim 1 wherein charge control circuitry is coupled with the battery, the charge control circuitry storing the first charge threshold as a maximum charge limit for the battery and being constructed and arranged to limit charging of the battery to the maximum charge limit; and
   wherein charging the battery in accordance with the geolocation assessment result includes:
   in response to the geolocation assessment result indicating that the utility vehicle is currently within the early charge termination geographic area, reconfiguring the charge control circuitry to use the second charge threshold as the maximum charge limit for the battery in place of the first charge threshold.

6. The method of claim 5 wherein generating the geolocation assessment result includes:
   detecting that the utility vehicle currently resides within a geofence based on the geolocation signal, and
   based on geofence data for the geofence, detecting that the geofence is an early charge termination type of geofence.

7. The method of claim 6 wherein the geolocation signal includes a global positioning system (GPS) coordinate which identifies the current location of the utility vehicle; and wherein detecting that the utility vehicle currently resides within the geofence includes:
ascertaining that the GPS coordinate is among a plurality of GPS coordinates defining the geofence.

8. The method of claim 7 wherein a GPS device couples with the charge control circuitry;

wherein ascertaining that the GPS coordinate is among the plurality of GPS coordinates defining the geofence and detecting that the geofence is the early charge termination type of geofence are performed within the GPS device; and wherein reconfiguring the charge control circuitry includes:
providing a reconfiguration command from the GPS device to the charge control circuitry to override the first charge threshold with the second charge threshold.

9. The method of claim 5 wherein the charge control circuitry resides within a motor controller constructed and arranged to operate a traction motor of the utility vehicle and a battery management system (BMS) constructed and arranged to manage access to the battery; and wherein reconfiguring the charge control circuitry includes:
providing a reconfiguration command to the motor controller that directs the motor controller to use the second charge threshold as the maximum charge limit for the battery in place of the first charge threshold.

10. The method of claim 9 wherein the motor controller couples with the BMS via a controller area network (CAN) bus; and wherein providing the reconfiguration command to the motor controller causes the motor controller to broadcast a CAN message on the CAN bus to the BMS directing the BMS to terminate charging of the battery when the motor controller senses that the battery has charged to the second charge threshold.

11. The method of claim 10 wherein providing the reconfiguration command to the motor controller further causes the BMS to provide a charge termination signal to a battery charger that charges the battery, the charge termination signal directing the battery charger to terminate charging of the battery.

12. The method of claim 10 providing the reconfiguration command to the motor controller that directs the motor controller to use the second charge threshold as the maximum charge limit for the battery in place of the first charge threshold occurs while the utility vehicle is stationary and the BMS is providing access to the battery to enable battery charging.

13. A utility vehicle, comprising:
a battery management system (BMS) having a lithium battery;
a utility vehicle propulsion system constructed and arranged to provide utility vehicle propulsion using electric power from the lithium battery; and
electronic circuitry coupled with the BMS and the utility vehicle propulsion system, the electronic circuitry being constructed and arranged to perform a method of:
receiving a geolocation signal which identifies a current location of the utility vehicle,
generating a geolocation assessment result indicating whether the utility vehicle is currently within an early charge termination geographic area based on the geolocation signal, and
charging the battery in accordance with the geolocation assessment result, the battery being charged to a first charge threshold when the geolocation assessment result indicates that the utility vehicle is currently not within the early charge termination geographic area, and the battery being charged to a second charge threshold when the geolocation assessment result indicates that the utility vehicle is currently within the early charge termination geographic area, the second charge threshold being different from the first charge threshold.

14. The utility vehicle of claim 13 wherein the utility vehicle propulsion system includes charge control circuitry coupled with the battery, the charge control circuitry storing the first charge threshold as a maximum charge limit for the battery and being constructed and arranged to limit charging of the battery to the maximum charge limit; and wherein charging the battery in accordance with the geolocation assessment result includes:
in response to the geolocation assessment result indicating that the utility vehicle is currently within the early charge termination geographic area, reconfiguring the charge control circuitry to use the second charge threshold as the maximum charge limit for the battery in place of the first charge threshold.

15. The utility vehicle of claim 14 wherein generating the geolocation assessment result includes:
detecting that the utility vehicle currently resides within a geofence based on the geolocation signal, and
based on geofence data for the geofence, detecting that the geofence is an early charge termination type of geofence.

16. The utility vehicle of claim 15 wherein the first charge threshold is a first amount of charge; and wherein the second charge threshold is a second amount of charge that is lower than the first amount of charge.

17. The utility vehicle of claim 15, further comprising:
a set of ground engagement members;
wherein the utility vehicle propulsion system includes:
an electric motor constructed and arranged to operate the set of ground engagement members, and
a motor controller coupled with the electronic circuitry, the motor controller including the charge control circuitry.

18. Electronic circuitry to charge a battery of a utility vehicle, the electronic circuitry comprising:
a communications interface constructed and arranged to couple with charge control circuitry and the battery of the utility vehicle; and
a controller coupled with the communications interface, the controller being constructed and arranged to perform a method of:
receiving a geolocation signal which identifies a current location of the utility vehicle,
generating a geolocation assessment result indicating whether the utility vehicle is currently within an early charge termination geographic area based on the geolocation signal, and
via communication through the communications interface, charging the battery in accordance with the geolocation assessment result, the battery being charged to a first charge threshold when the geolocation assessment result indicates that the utility vehicle is currently not within the early charge termination geographic area, and the battery being charged to a second charge threshold when the geolocation assessment result indicates that the utility vehicle is currently within the early charge termination geographic area, the second charge threshold being different from the first charge threshold.

* * * * *